(12) United States Patent
Sharma et al.

(10) Patent No.: US 12,046,049 B2
(45) Date of Patent: Jul. 23, 2024

(54) AUTOMATICALLY DETECTING TRAFFIC SIGNALS USING SENSOR DATA

(71) Applicant: MOTIONAL AD LLC, Boston, MA (US)

(72) Inventors: Dhananjai Sharma, Singapore (SG); Bartolomeo Della Corte, Singapore (SG)

(73) Assignee: Motional AD LLC, Boston, MA (US)

( * ) Notice: Subject to any disclaimer, the term of this patent is extended or adjusted under 35 U.S.C. 154(b) by 414 days.

(21) Appl. No.: 17/539,412

(22) Filed: Dec. 1, 2021

(65) Prior Publication Data
US 2023/0169780 A1 Jun. 1, 2023

(51) Int. Cl.
*G06V 20/58* (2022.01)
*G01S 17/89* (2020.01)
(Continued)

(52) U.S. Cl.
CPC ............ *G06V 20/584* (2022.01); *G01S 17/89* (2013.01); *G06N 3/02* (2013.01); *G06T 7/70* (2017.01);
(Continued)

(58) Field of Classification Search
CPC ......... G06V 20/584; G06T 7/70; G01S 17/89; G06N 3/02; G08G 1/096708
See application file for complete search history.

(56) References Cited

U.S. PATENT DOCUMENTS 10,816,993 B1 * 10/2020 Tran ........................ G06V 20/56
2012/0288138 A1 * 11/2012 Zeng ................... G08G 1/09623
382/103
(Continued)

FOREIGN PATENT DOCUMENTS

| CN | 102117546 | 7/2011 |
| CN | 102792316 | 11/2012 |

(Continued)

OTHER PUBLICATIONS

Weber et al., "DeepTLR: A single Deep Convolutional Network for Detection and Classification of Traffic Lights," 2016 IEEE Intelligent Vehicles Symposium (IV), Gothenburg, Sweden, Jun. 19-22, 2016, pp. 342-348.
(Continued)

*Primary Examiner* — Edward Park
(74) *Attorney, Agent, or Firm* — Fish & Richardson P.C.

(57) ABSTRACT

Provided are methods for automatically detecting traffic signals using sensor data. The methods can include obtaining first sensor data and second sensor data regarding an environment of an autonomous vehicle, where the first sensor data represents at least one image of the environment generated by at least one image sensor of the autonomous vehicle, where the second sensor data represents a three-dimensional point cloud associated with the environment, and where the second sensor data is generated by at least one range sensor of the autonomous vehicle. The method can also include determining a portion of the at least one image corresponding to a traffic signal in the environment, determining a point cluster of the point cloud corresponding to the portion of the at least one image, and determining a location of the traffic signal based on the point cluster. Systems and computer program products are also provided.

12 Claims, 12 Drawing Sheets

(51) Int. Cl.
*G06N 3/02* (2006.01)
*G06T 7/70* (2017.01)
*G06V 10/25* (2022.01)
*G06V 10/762* (2022.01)
*G06V 10/82* (2022.01)
*G08G 1/0967* (2006.01)

(52) U.S. Cl.
CPC ............ *G06V 10/25* (2022.01); *G06V 10/762* (2022.01); *G06V 10/82* (2022.01); *G08G 1/096708* (2013.01); *G06T 2207/10028* (2013.01); *G06T 2207/20084* (2013.01)

(56) References Cited

U.S. PATENT DOCUMENTS

| | | | | |
|---|---|---|---|---|
| 2013/0211682 | A1* | 8/2013 | Joshi | B60R 11/04 701/1 |
| 2013/0253754 | A1* | 9/2013 | Ferguson | G05D 1/0231 701/28 |
| 2014/0118169 | A1* | 5/2014 | Hamberger | B60K 31/18 340/936 |
| 2017/0193312 | A1* | 7/2017 | Ai | G01S 17/42 |
| 2019/0155973 | A1* | 5/2019 | Morczinek | G06N 20/00 |
| 2019/0278273 | A1* | 9/2019 | Behrendt | G05D 1/021 |
| 2020/0135030 | A1 | 4/2020 | Krivokon et al. | |
| 2020/0166363 | A1* | 5/2020 | McGavran | G07C 5/008 |
| 2020/0175720 | A1* | 6/2020 | Hsu | H04N 13/293 |
| 2021/0157006 | A1* | 5/2021 | Sun | G06V 20/56 |
| 2021/0201057 | A1 | 7/2021 | Lin et al. | |
| 2023/0169780 | A1* | 6/2023 | Sharma | G08G 1/096708 |

FOREIGN PATENT DOCUMENTS

| | | |
|---|---|---|
| CN | 109635640 | 4/2019 |
| CN | 111724616 | 9/2020 |
| CN | 111837136 | 10/2020 |
| CN | 112735253 | 4/2021 |
| CN | 112986979 | 6/2021 |
| CN | 113673386 | 11/2021 |
| GB | 2594118 | 10/2021 |
| GB | 2601837 | 6/2022 |
| KR | 10-2016-0143885 | 12/2016 |

OTHER PUBLICATIONS

Yu et al., "Automated Extraction of Urban Road Facilities Using Mobile Laser Scanning Data," IEEE Transactions on Intelligent Transportation Systems, Aug. 2015, 16(4):2167-2181.

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

* cited by examiner

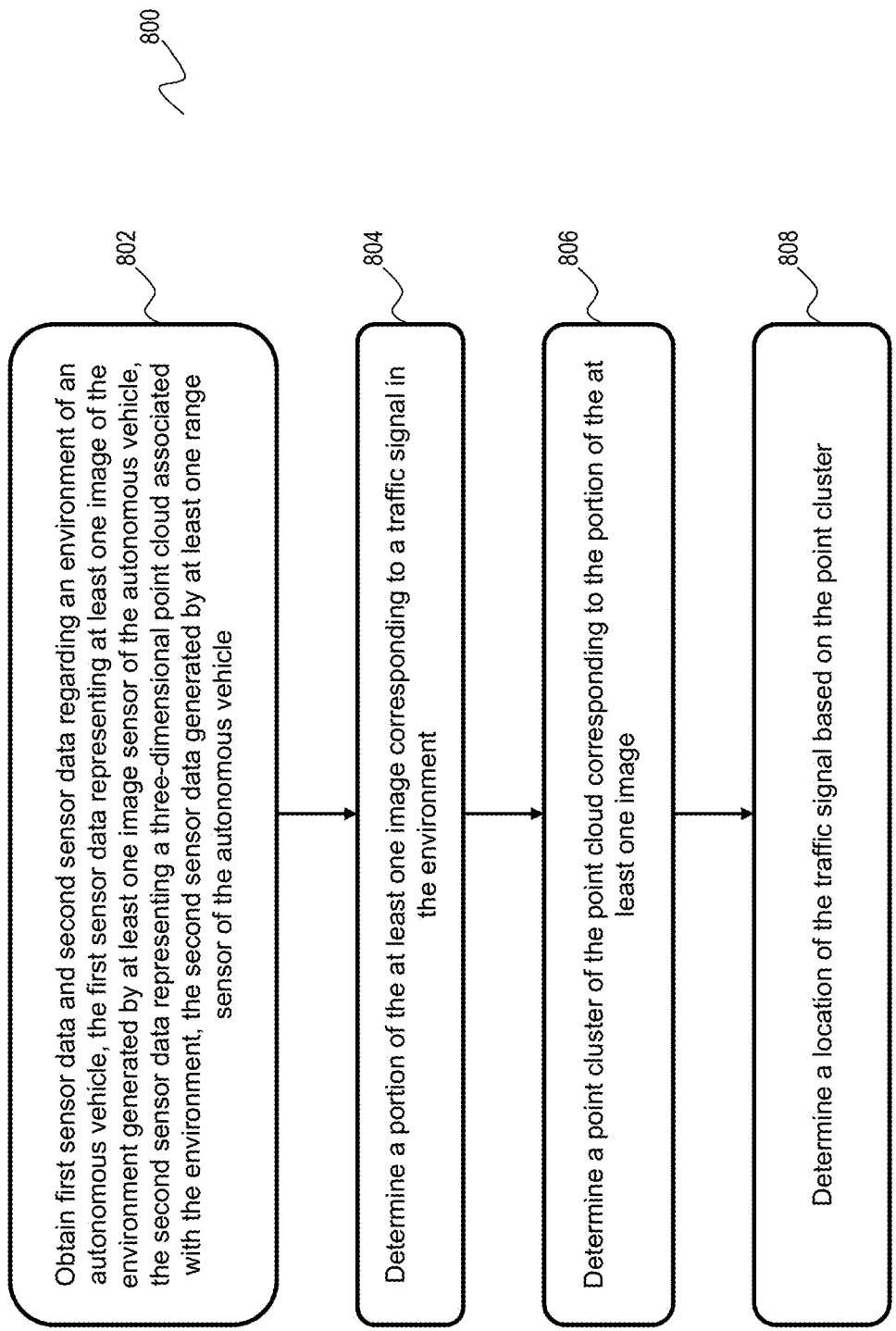

AUTOMATICALLY DETECTING TRAFFIC SIGNALS USING SENSOR DATA

BACKGROUND

Traffic signals are signaling devices that are used to regulate the flow of traffic along one or more roads. As an example, traffic signals can regulate the flow of vehicular and/or pedestrian traffic through an intersection (e.g., a convergence of two or more roads). For instance, the traffic signals can instruct traffic traveling in a first direction to proceed through the intersection, while concurrently instructing traffic traveling in a second direction to stop prior to the intersection, such that a collision does not occur.

BRIEF DESCRIPTION OF THE FIGURES

FIG. 8 is a flowchart of a process for automatically detecting traffic signals using sensor data.

DETAILED DESCRIPTION

Figure 1:
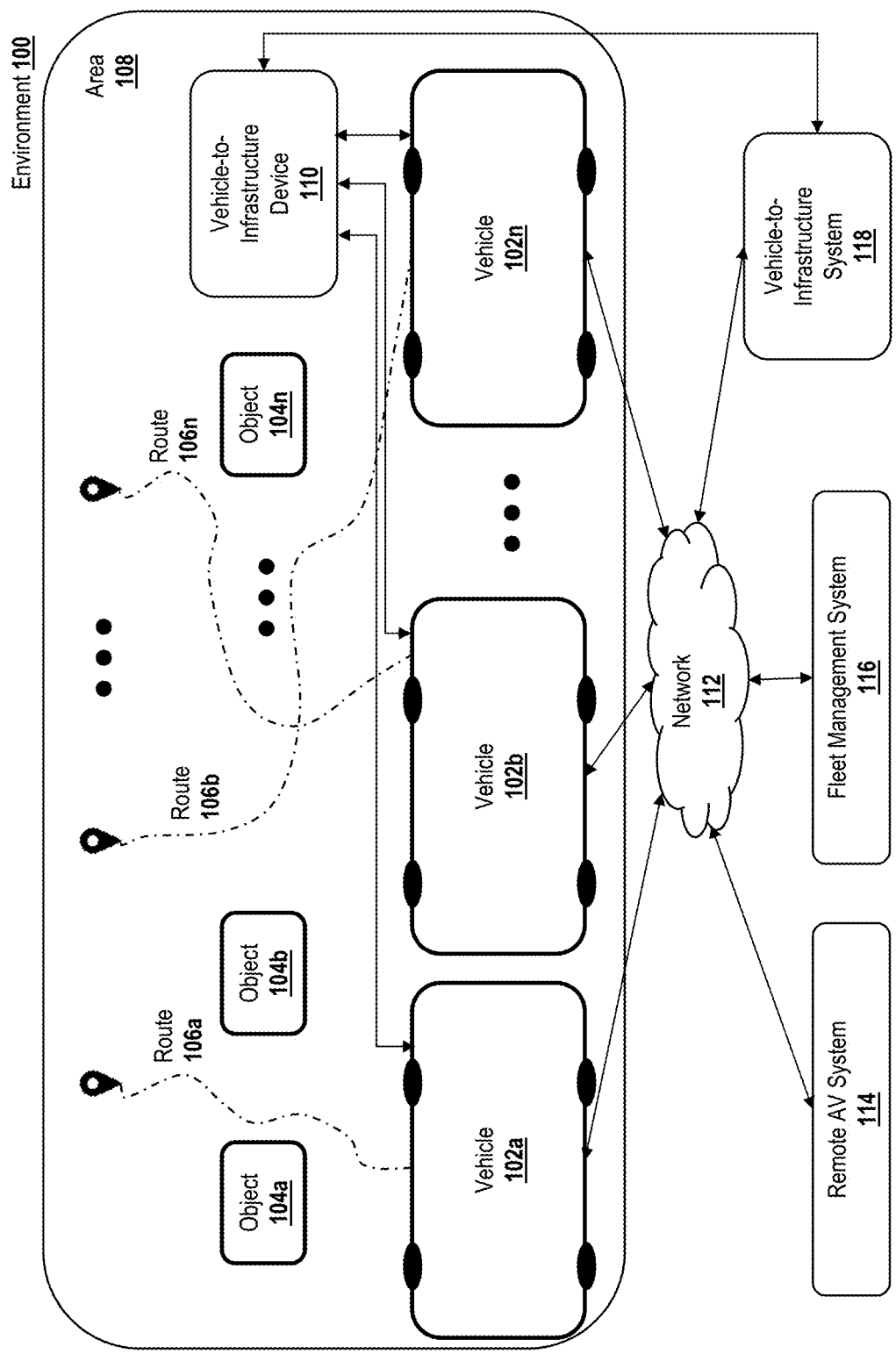
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, the systems, methods, and computer program products described herein include and/or implement techniques for automatically detecting traffic signals using sensor data. In an example implementation, a computerized traffic signal detection system is configured to detect the presence of one or more traffic signals, and to generate information regarding the location and orientation of each of the detected traffic signals. Information regarding the detected signals can be used to train artificial intelligence systems to automatically identify traffic signals in an environment of an autonomous vehicle and/or to guide the navigation of an autonomous vehicle through an environment.

As an illustrative example, a traffic signal detection signal can receive two-dimensional image data (e.g., images captured by one or more cameras of an autonomous vehicle) and three-dimensional point cloud data (e.g., point cloud data captured by one or more LiDAR sensors of the autonomous vehicle). Using a neural network, the system can automatically identify portions of the images corresponding to traffic signals, and identify clusters of points coinciding with the identified portions. Based on the identified clusters, the system can determine the locations and/or the orientations of the traffic signals in three-dimensional space.

Some of the advantages of these techniques include enabling automated systems to detect traffic signals with a greater degree of accuracy (e.g., compared to detecting traffic signals without the aid of the systems and techniques described herein). In some implementations, this enables automated systems to detect traffic signals without relying on manual human input, which may be time consuming and/or inefficient. Further, information regarding detected traffic signals can be used to improve the safety of an autonomous vehicle. As an example, information regarding detected traffic signals can be used to train a machine learning system to recognize traffic signals, such that traffic signals can be detected more accurately without human input. As another example, information regarding detected traffic signals can be provided to a navigation system, such that the navigation system can guide the autonomous vehicle through an environment in accordance with the traffic signals.

In some embodiments, the techniques described herein can be implemented within vehicles, such as vehicles having autonomous systems (e.g., autonomous vehicles) and/or vehicles that do not have autonomous systems.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
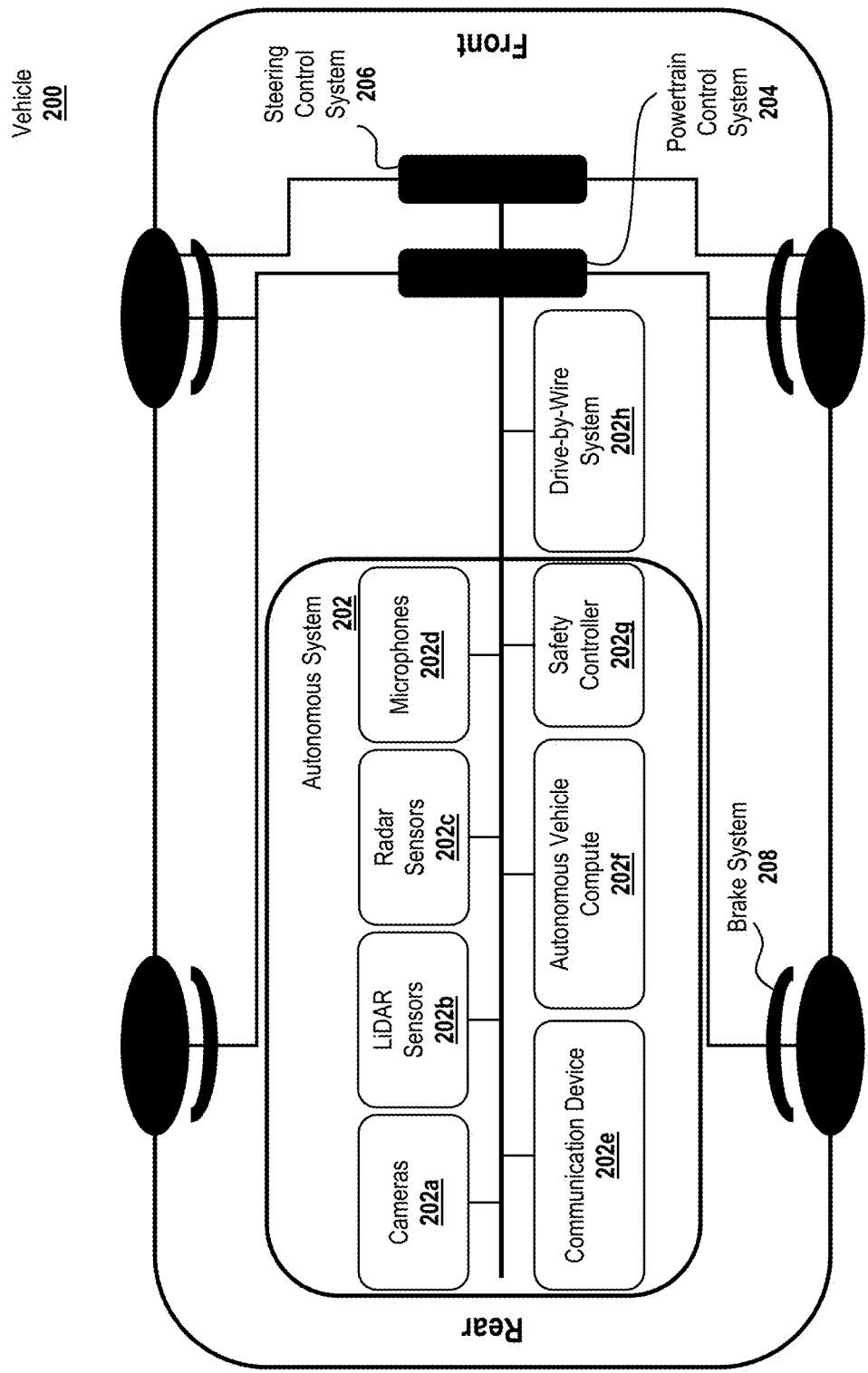
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
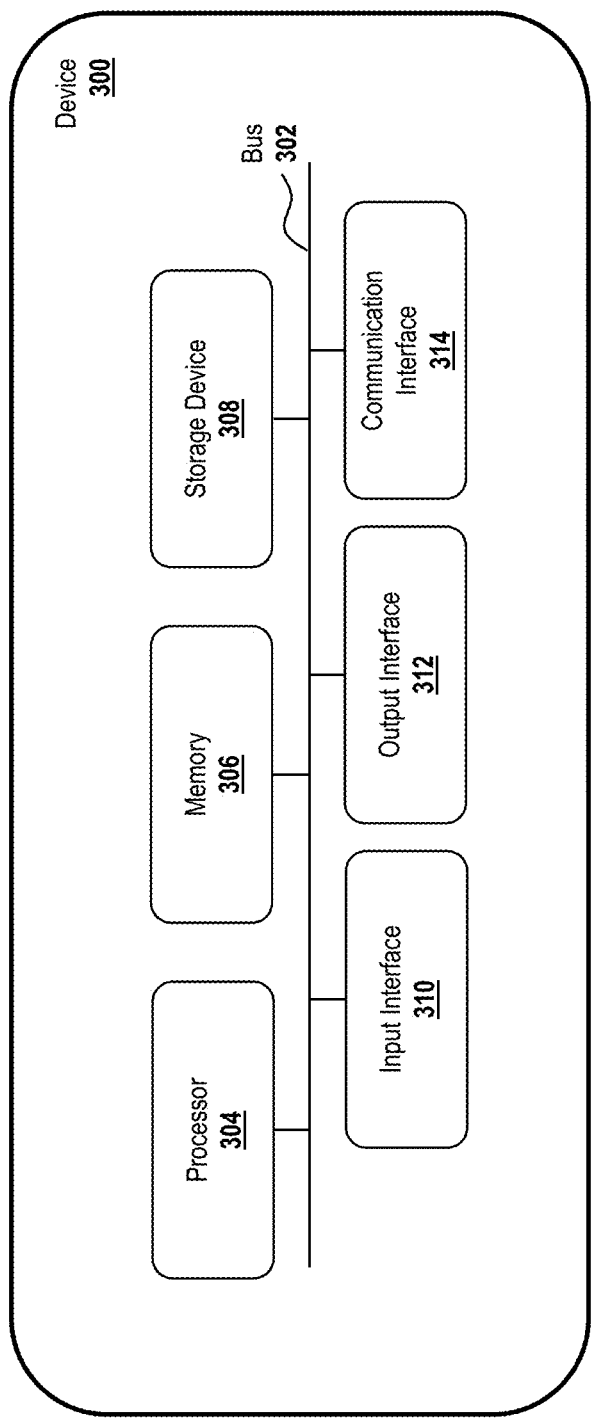
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. In some embodiments, device 300 corresponds to at least one device of vehicles 102 (e.g., at least one device of a system of vehicles 102) and/or vehicle 200, at least one device of remote AV system 114, fleet management system 116, V2I system 118, and/or one or more devices of network 112 (e.g., one or more devices of a system of network 112). In some embodiments, one or more devices of vehicles 102 and/or 202 (e.g., one or more devices of a system of vehicles 102 and 202, such as the autonomous system 202), remote AV system 114, fleet management system 116, V2I system 118, and/or one or more devices of network 112 (e.g., one or more devices of a system of network 112) include at least one device 300 and/or at least one component of device 300. In some implementations, an traffic signal detection system 500 (e.g., as described in further detail with reference to FIG. 5) can be implemented at least in by using one or more of the devices 300.

As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
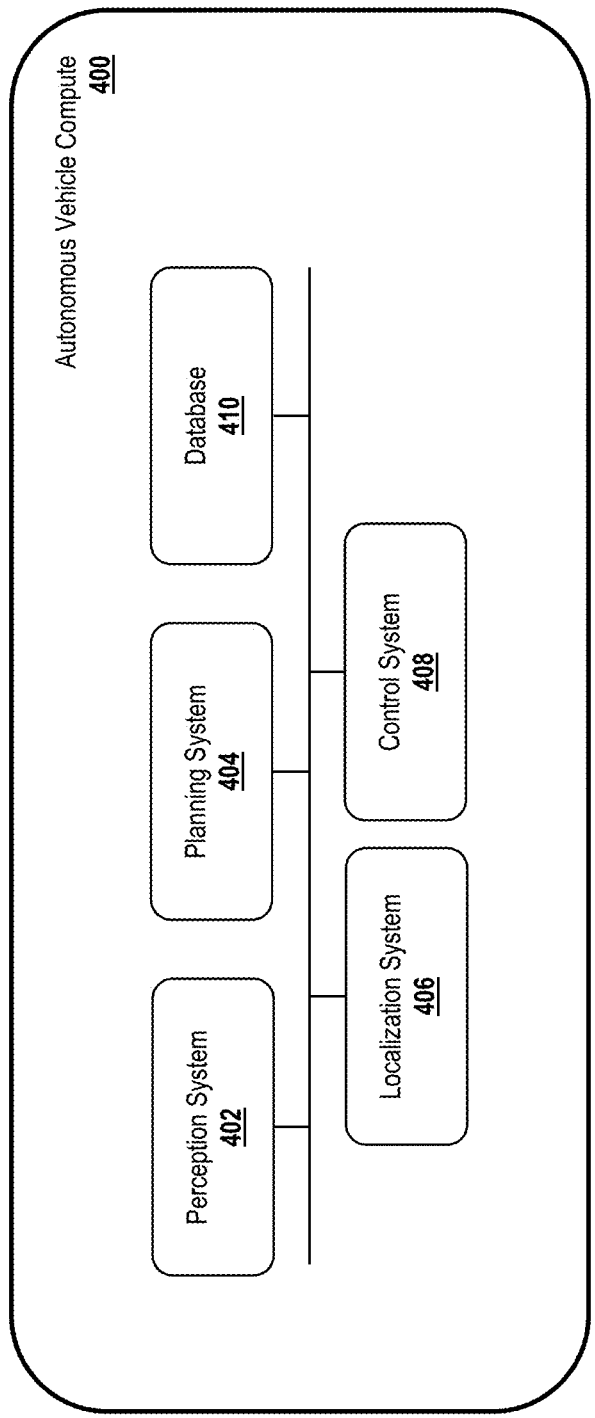
FIG. 4 is a diagram of an example autonomous vehicle compute.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 7A-7C.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Example Traffic Detection Systems

Figure 5:
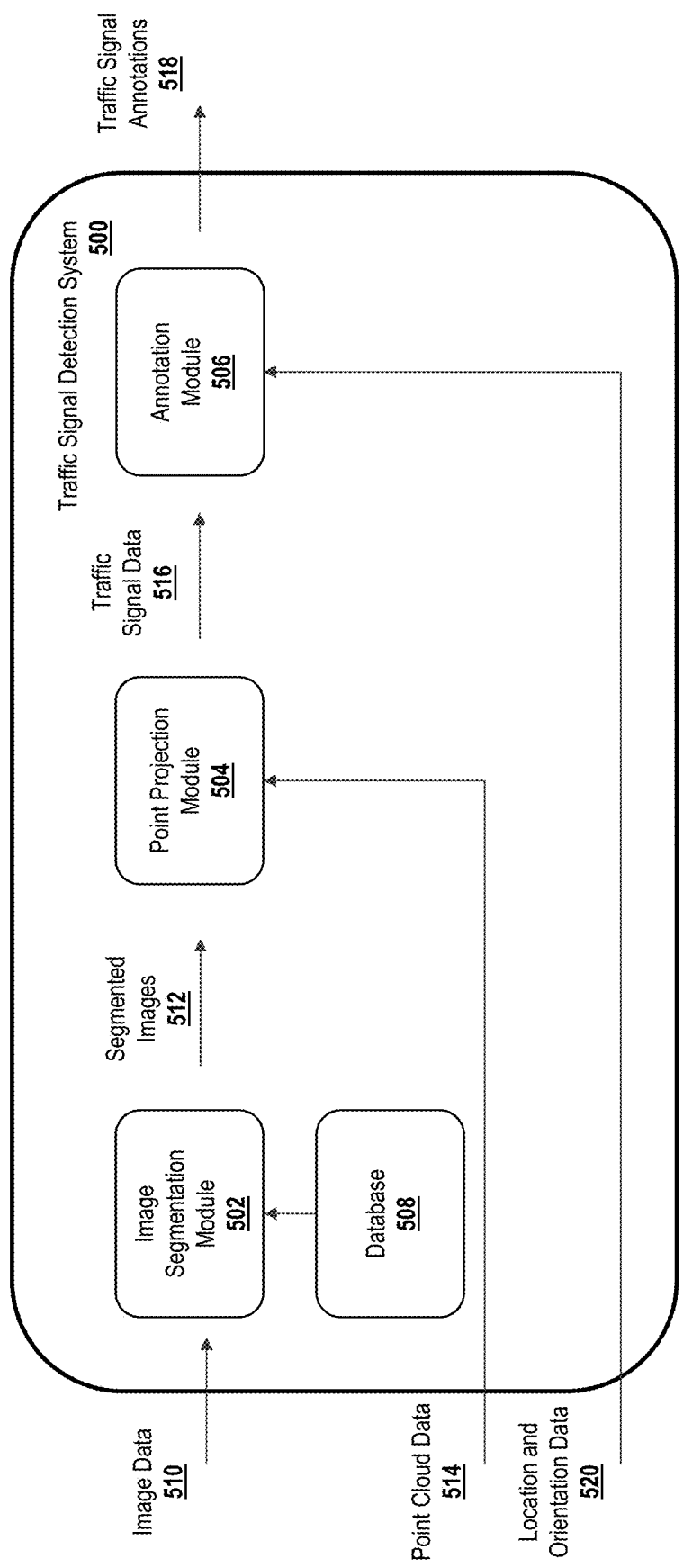
FIG. 5 is a diagram of an example traffic signal detection system.

FIG. 5 shows aspects of an example traffic signal detection system 500. As described above, the traffic signal detection system 500 is configured to detect the presence of one or more traffic signals (e.g., in an environment of an autonomous vehicle, such as the vehicle 200), and to generate information regarding the location and orientation of each of the detected traffic signals. Information regarding the detected signals can be used to train artificial intelligence systems to automatically identify traffic signals in an environment of an autonomous vehicle and/or to guide the navigation of an autonomous vehicle through an environment.

In some embodiments, the traffic signal detection system 500 can be implemented, at least in part, as one or more components of a vehicle 200. For example, the traffic signal detection system 500 can be implemented as a part of the autonomous system 202, such as a part of the autonomous vehicle compute 202f, 400 and/or one or more components thereof (e.g., the perception system 402, the planning system 404, the localization system 406, the control system 408, and/or the database 410). As another example, the traffic signal detection system 500 can be implemented, at least in part, as one or more stand-alone components of the vehicle 200.

In some embodiments, the traffic signal detection system 500 can be implemented, at least in part, as one or more components that are remote from the vehicle 200. As an example, the traffic signal detection system 500 can be implemented as a component of the remote AV system 114, the fleet management system 116, and/or the V2I system 118. As another example, the traffic signal detection system 500 can be implemented, at least in part, as one or more stand-alone systems (e.g., one or more computer devices, such as a cloud computing system) that are remote from the vehicle 200.

The traffic signal includes an image segmentation module 502, a point projection module 504, an annotation module 506, and a database 508. Each of the modules can be implemented in software, firmware, hardware, or any combination thereof.

During an example operation of the traffic signal detection system 500, the traffic signal detection system 500 receives image data 510 representing and/or including one or more two-dimensional images of an exterior environment (e.g., an environment of the vehicle 200). In some implementations, the image data 510 can be generated, at least in part, using one or more image sensors (e.g., still cameras, video cameras, etc.). As an example, the image data 510 can be generated, at least in part, by one or more of the cameras 202a of the vehicle 200 (e.g., as described with reference to FIG. 2), and provided to the traffic signal detection system 500. As another example, the image data 510 can be generated, at least in part, by one or more cameras that are remote from the vehicle 200, and provided to the traffic signal detection system 500 for processing.

The image segmentation module 502 segments the image data 510 into different portions, depending on the characteristics and/or contents of the image data 510.

As an example, the image segmentation module 502 can analyze the contents of each of the images represented by the image segmentation module 502, determine portions of the image corresponding to one or more traffic signals. Further, the image segmentation module 502 can segment the image into two or more image segments (e.g., portions of the image), such that one or more of the image segments corresponding to a traffic signal are distinguished from one or more other images segments that do not correspond to a traffic signal.

In some implementations, the image segmentation module 502 can determine one or more boundaries that separate the image segments from one another. As an example, the image segmentation module 502 can determine one or more bounding boxes that enclose a first image segment, and distinguish the first image segment from one or more other image segments (e.g., images segments that are not enclosed by the bounding box). A bounding boxes can include one or more closed polygonal outlines forming one or more two-dimensional and/or three-dimensional shapes. As an example, a bounding box can include one or more polygonal outlines that define one or more triangles, squares, pentagons, hexagons, and/or any other two-dimensional shape. As another example, a bounding box can include one or more polygonal outlines that define one or more polyhedrons. In some implementations, a bounding box can be represented as a series of vertices and/or lines (e.g., represented as sets of image coordinates, such as x-y coordinates, and/or vectors).

Further, for at least some of the image segments, the image segmentation module 502 can determine one or more confidence metrics, each representing the likelihood that a respective one of the image segments corresponds to a traffic signal. For example, if the image segmentation module 502 determines, with a high degree of confidence, that a first image segment corresponds to a traffic signal, the image segmentation module 502 can assign the first image segment a high confidence metric. As another example, if the image segmentation module 502 determines, with a low degree of confidence, that a second image segment corresponds to a traffic signal, the image segmentation module 502 can assign the second image segment a low confidence metric.

Figure 6A:
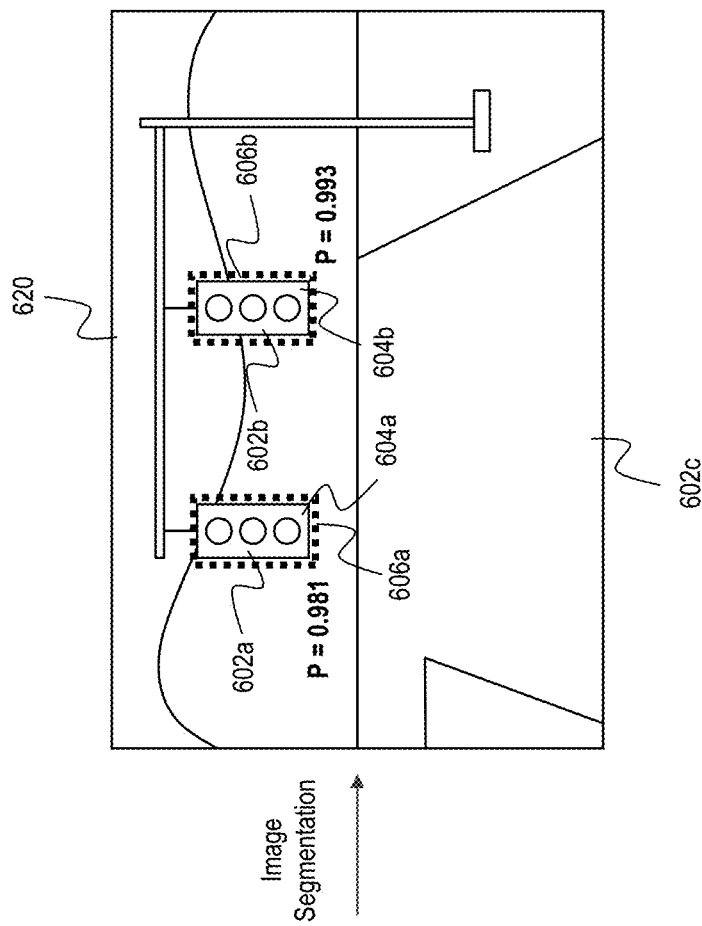
FIGS. 6A-6C are diagrams of example operations performed by a traffic signal detection system.
Figure 6A:
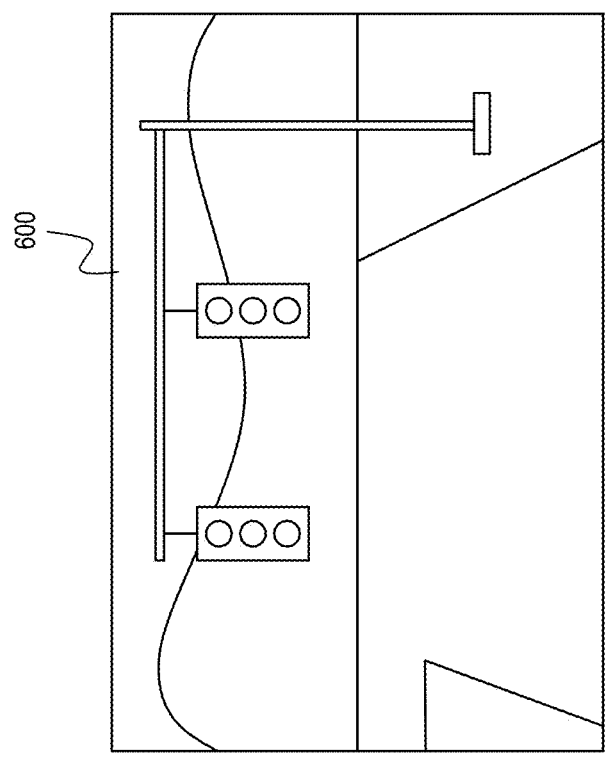

As an illustrative example, FIG. 6A (left pane) shows an image 600 of an exterior environment (e.g., an image of a roadway generated by one or more cameras). The image segmentation module 502 can analyze the characteristics and contents of the image 600. Further, based on the analysis, the image segmentation module 502 can segment the image 600 into a first image segment 602a corresponding to a first traffic signal 604a (e.g., enclosed by a first bounding box 606a), a second image segment 602b corresponding to a second traffic signal 604b (e.g., enclosed by a second bounding box 606b), and a third image segment 602c corresponding to the remainder of the image 600 (e.g., the portion of the image 600 that is not enclosed by the first bounding box 606a or the second bounding box 606b). An example segmented image 620 is shown in FIG. 6A, (right pane).

Further, the image segmentation module 502 can determine, for each of the image segments 602a and 602b, a respective confidence metric representing the likelihood that the image segment corresponds to a traffic signal. For instance, in the example shown in FIG. 6A, the image segmentation module 502 determines that the likelihood that the image segment 602a corresponds to a traffic signal is 98.1% (e.g., P=0.981, where P=1 indicates a 100% likelihood). Further, the image segmentation module 502 determines that the likelihood that the image segment 602b corresponds to a traffic signal is 99.3% (e.g., P=0.993).

In some implementations, the image segmentation module 502 can make at least some of the determinations described herein based on one or more machine learning models. For example, a machine learning model can be trained to receive input data (e.g., image data representing one or more images of an environment), and based on the input data, generate output data associated with one or more predictions regarding the locations of traffic signals within those images. The image segmentation module 502 can segment the image into one or more image segments based on the predictions.

As an example, a machine learning model can be trained using training data including one or more previously generated images of one or more exterior environments (e.g., training data stored in the database 508). In some implementations, at least some of these images can be generated by a single vehicle 200 (e.g., a vehicle 200 implementing the traffic signal detection system 500). In some implementations, at least some of these images can be generated by one or more other vehicles or systems (e.g., a vehicle other than the vehicle implementing the traffic signal detection system 500, a remote computer system, etc.).

For each of the images, the training data can include data representing whether any traffic signals are depicted in that image, and if so, the portions of the image that correspond to the traffic signal(s). For example, the training data can include one or more bounding boxes (e.g., represented by a series of vertices and/or lines), each enclosing a different traffic signal depicted in an image. The vertices and/or lines can be represented, for example, as sets of image coordinates (e.g., x-y coordinates) and/or vectors.

Based on the training data, the machine learning model can be trained to identify correlations, relationships, and/or trends between (i) the input data (e.g., one or more images), and (ii) the portions of the input data (if any) that correspond to traffic signals (e.g., portions of images that depict a traffic signal).

Once the machine learning model has been trained, the image segmentation module 502 can provide newly obtained input data to the machine learning model (e.g., the image data 510) to determine the portions of the input data that are predicted to correspond to traffic signals. Further, the image segmentation module 502 can segment the image data 510 (e.g., using one or more bounding boxes) to distinguish portions of an image corresponding to traffic signals from other portions of the image that do not correspond to traffic signals.

Figure 7A:
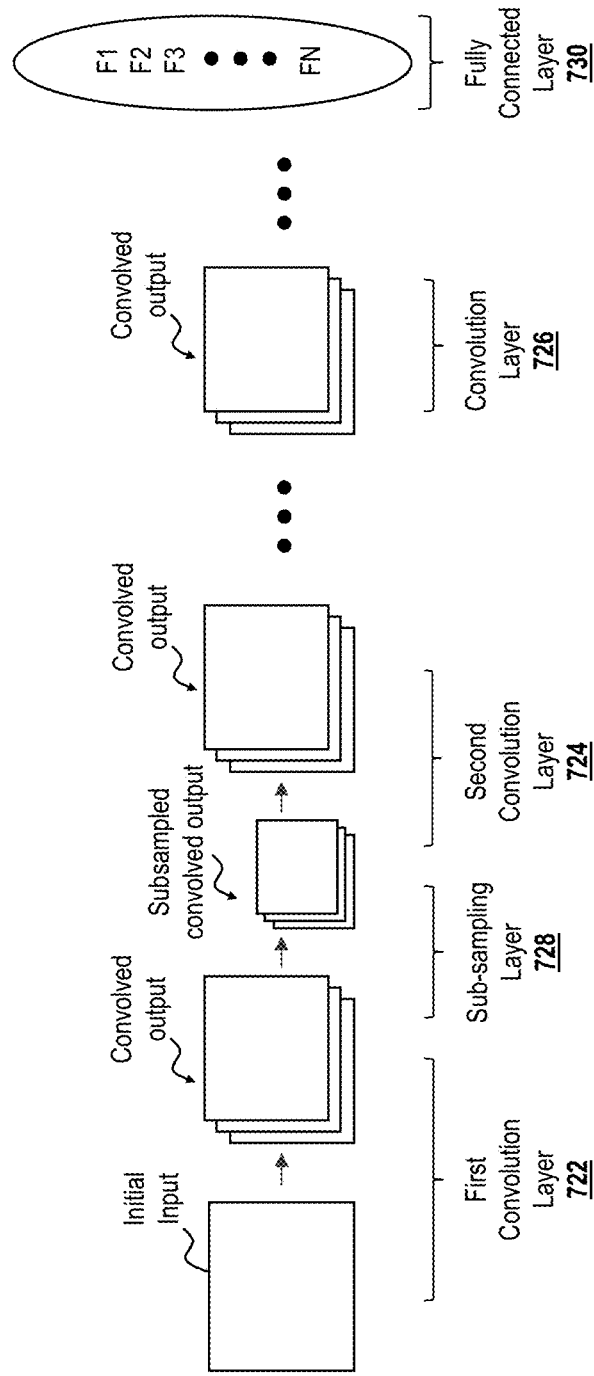
FIG. 7A is a diagram of an implementation of a neural network.

Example machine learning models are described in further detail with reference to FIGS. 7A-7C.

Referring back to FIG. 5, the image segmentation module 502 provides segmented images 512 to the point projection module 504. Further, the point projection module 504 receives point cloud data 514 regarding the exterior environment (e.g., the environment of the vehicle 200). For example, the point cloud data 514 can represent and/or include a three-dimensional cloud of the same exterior environment as that depicted in the images of the image data 510 and/or the segmented images 512.

In some implementations, the point cloud data 514 and the image data 510 can be generated concurrently by a sensor system. For example, as the vehicle 200 traverses an environment, the sensor system can concurrently generate one or more images (e.g., using one or more cameras) and one or more point clouds, such that the images and the point clouds represent subjects in the exterior angle from the same viewpoint and/or viewport.

In some implementations, the point cloud data 514 can be generated, at least in part, using one or more range sensors (e.g., LiDAR sensors, time of flight sensors, radar sensors, etc.). As an example, the point cloud data 514 can be generated, at least in part, by one or more of the LiDAR sensors 202b and/or radar sensors 202c of the vehicle 200 (e.g., as described with reference to FIG. 2), and provided to the traffic signal detection system 500 for processing. As another example, the point cloud data 514 can be generated, at least in part, by one or more range sensors that are remote from the vehicle 200, and provided to the traffic signal detection system 500 for processing.

The point projection module 504 projects at least a portion of the point cloud data 514 onto the segmented images 512. For example, the point projection module 504 can align or register the segmented images 512 and point cloud data 514, such that they collectively provide spatial information regarding one or more subjects in the exterior environment. As an example, the point cloud data 514 and/or the segmented images 512 can be rotated, translated, skewed, warped, or otherwise manipulated, such that the segmented images 512 and point cloud data 514 represent a common portion of the exterior environment according to a common viewpoint and/or viewpoint.

Further, the point projection module 504 can determine the subset of the points in the point cloud data 514 that coincide with the image segments identified by the image segmentation module 502 as corresponding to traffic signals. For example, upon projecting at least a portion of the point cloud data 514 onto the segmented images 512, the point projection module 504 can identify the subset of the points of the point cloud data 514 that are enclosed by the bounding boxes generated by the image segmentation module 502 (e.g., bounding boxes enclosing portion of the image data 510 corresponding to traffic signals). Further, the point projection module 504 can discard or otherwise ignore the remaining points in the point cloud data 514.

Figure 6B:
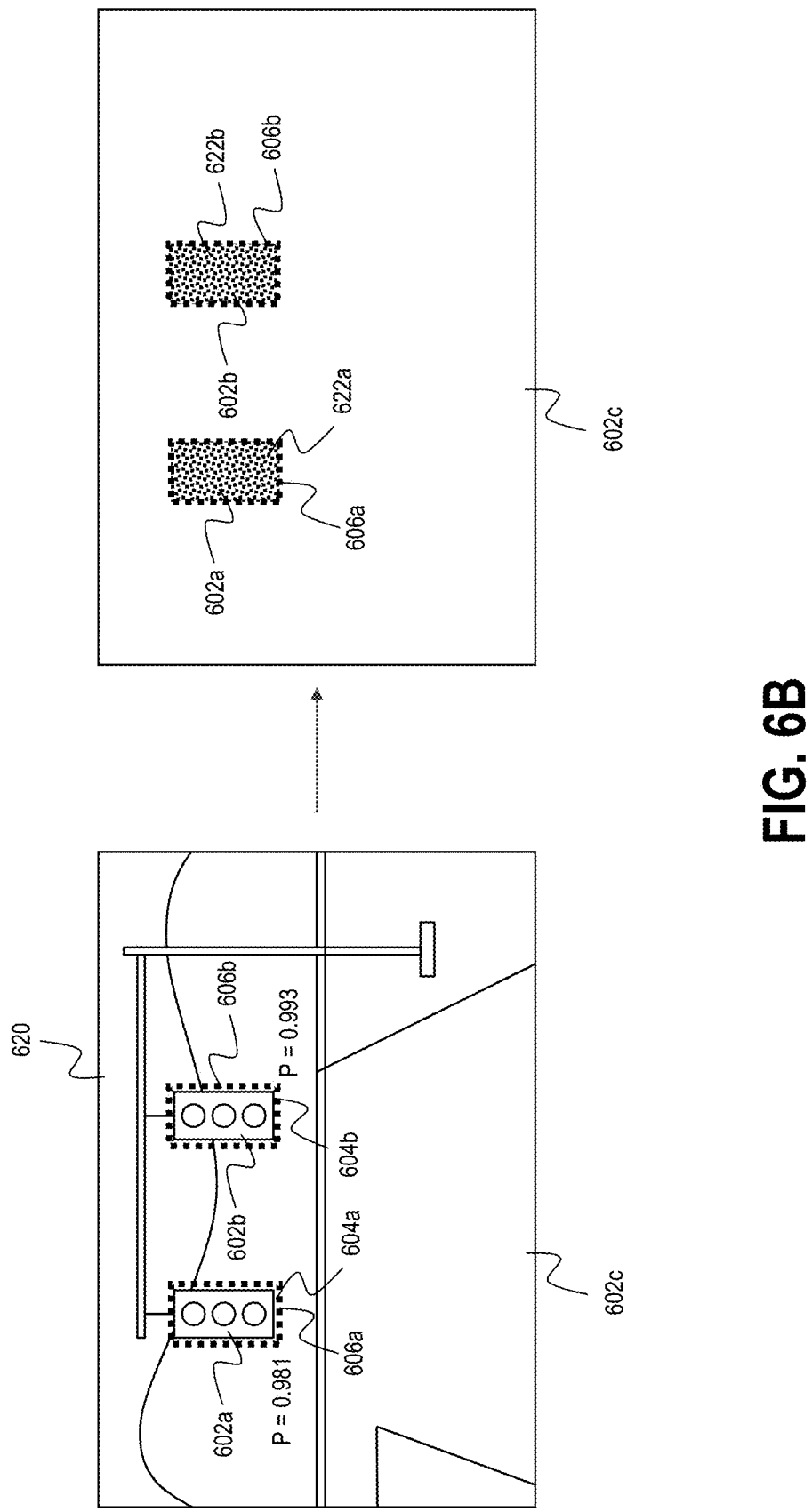

As an illustrative example, FIG. 6B (left pane) shows a segmented image 620 of an environment. In general, the segmented image 620 can be similar to that shown and described with reference to FIG. 6A. For example, as shown in FIG. 6B, the segmented image 620 can be an image of a roadway generated by one or more cameras, and segmented into different image segments 602a-602c based on traffic signals identified in the image.

The point projection module 504 can project point cloud data regarding the environment onto the segmented image 620, such that each of the points of the point cloud are aligned or registered to a particular location on the segmented image 620 (e.g., corresponding to the spatial location of that point in the environment). Further, as shown in FIG. 6B (right plane), the point projection module 504 can select clusters of points 622a and 622b that coincide with the image segments 602a and 602b identified by the image segmentation module 502 as corresponding to traffic signals. Further, the point projection module 504 can discard or otherwise ignore the remaining points in the point cloud data 514 (not shown in FIG. 6B).

As an example, the upon projecting at least a portion of the point cloud data onto the segmented image 620, the point projection module 504 can identify a cluster of points 622a that are enclosed by the bounding box 606a (e.g., corresponding to the traffic signal 604a), and a cluster of points 622b that are enclosed by the bounding box 606b (e.g., corresponding to the traffic signal 604b). Further, the point projection module 504 can discard or otherwise ignore the remaining points in the point cloud data (e.g., the points that do not correspond to a traffic signal).

Referring back to FIG. 5, the point projection module 504 provides traffic signal data 516 for each of the identified traffic signals (e.g., data representing 518 the bounding boxes generated by the image segmentation module 502 and the corresponding clusters of point clouds identified by the point project module 504). Based on the traffic signal data 516, the annotation module 506 generates annotations 518 regarding each of the traffic signals represented in the image data 510 and the point cloud data 514.

As an example, for each of the traffic signals, the annotation module 506 can generate a unique identifier for that traffic signal (e.g., if the traffic signal has not been previously detected by the traffic signal detection system 500) or determine a unique identifier that had been previously generated for that traffic signal (e.g., if the traffic signal had been previously detected by the traffic signal detection system 500) In some implementations, the unique identifier can include an alphanumeric sequence or code that distinguishes the traffic signal from other traffic signals.

Further, the annotation module 506 can associate the unique identifier with data representing the bounding box and/or the cluster of points for that traffic signal.

Further still, the each of the traffic signals, the annotation module 506 can generate location data indicating the geographical location of that traffic signal, and associate the location data with the traffic signal's unique identifier.

For example, the annotation module 506 can access data 520 indicating the geographical location at which the image data 510 and the point cloud data 514 were generated (e.g., geographical coordinates indicating the location of the cameras and/or range sensors at the time that they generated images and/or point clouds). Further, the annotation module 506 can access data 520 indicating the orientation or perspective of the image data 510 and the point cloud data 514 (e.g., the direction that the cameras and/or range sensors were facing at the time that they generated images and/or point clouds, such as an angular displacement with respect to one or more directional axes). In some implementations, the data 520 can be included in the image data 510 and/or the point cloud data 514 (e.g., stored as metadata). In some implementations, the data 520 can be stored separately from the image data 510 and/or the point cloud data 514.

Based on the data 520, the annotation module 506 determines the geographical location of each of the traffic signals representing the image data 510 and the point cloud data 514. For example, the annotation module 506 can determine the portion of the image data 510 and/or the point cloud data 514 corresponding to a traffic signal (e.g., the spatial position of the traffic signal in an image and/or a point cloud), and determine a geographical location corresponding to that portion. In some implementations, the annotation module 506 can indicate the location of a traffic signal using geographical coordinates (e.g., latitude and longitude coordinates) and elevation (e.g., distance above sea level, distance above the ground, etc.).

In some implementations, the traffic signal annotations 518 can also indicate, for each of the traffic signals, the orientation of that traffic signal. For example, the traffic signal annotations 518 can indicate the direction that the visual indicators of the traffic signal (e.g., the signaling lights) are facing, such as using a compass heading and/or a directional vector.

In some implementations, the traffic signal detection system 500 can determine the orientation of a traffic signal by obtaining the cluster of points for that traffic signal, and fitting one or more planes to that the cluster of points. Further, the traffic signal detection system 500 selects the plane that best fits the cluster of points (e.g., the plane having the closest alignment with the cluster of points), and determines a directional vector that is normal to that plane. The directional vector is selected as the orientation of the traffic signal. In some implementation, a plane can be fit to the cluster of points using a regression technique (e.g., multiple linear regression).

Figure 6C:
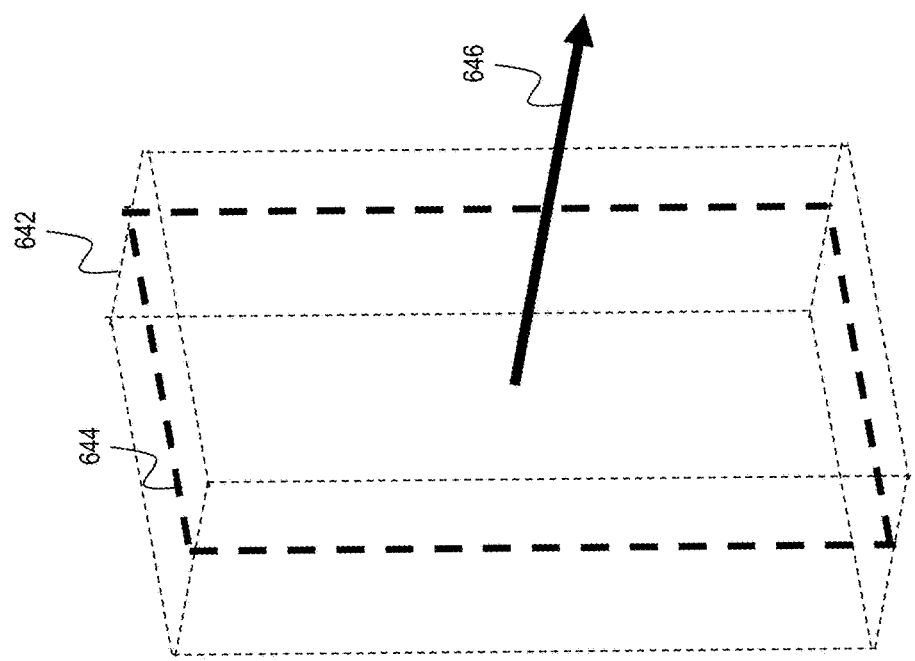
Figure 6C:
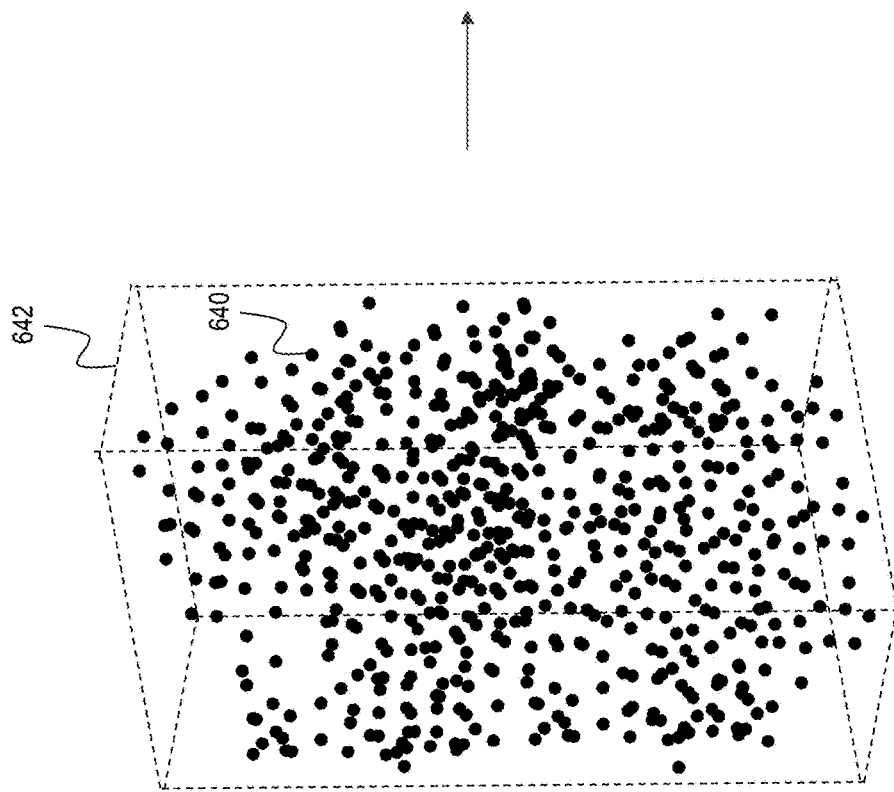

As an illustrative example, FIG. 6C (left pane) shows a cluster of points 640 (e.g., enclosed by a three-dimensional bounding box 642) representing a traffic signal. As shown in FIG. 6C (right pane), the traffic signal detection system 500 can determine a plane 644 that best fits the cluster of points 640, and a vector 646 normal to the plane 644. The vector 646 can be selected as the orientation of the traffic signal.

In some implementations, the traffic signal annotations 518 can include one or more data records or data structures, where each data record or data structure indicates information regarding a respective traffic signal. For example, each data record or data structure can indicate a unique identifier for a particular traffic signal, one or more images and/or point clouds representing that traffic signal, a bounding box for that traffic signal, a geographical location of that traffic signal, and/or an orientation of that traffic signal.

In some implementations, traffic signal detection system 500 can selectively generate new data records or data structures for each newly detected traffic signal. For example, each time that a new traffic signal is detected (e.g., using the techniques described herein), the traffic signal detection system 500 can generate a new data record or data structure. Further, the traffic signal detection system 500 can include information regarding the traffic signal in the data record or data structure, such as a unique identifier for that traffic signal, one or more images and/or point clouds representing that traffic signal, a bounding box for that traffic signal, a geographical location of that traffic signal, and/or an orientation of that traffic signal.

In some implementations, traffic signal detection system 500 can selectively modify an already exiting data record or data structure to include additional information regarding a traffic signal. For example, when the traffic signal detection system 500 detects a traffic signal that had previously been detected before (e.g., by the traffic signal detection system 500 or another system), the traffic signal detection system 500 can retrieve the data record or data structure associated with that data structure, and update the data record or data structure with additional information regarding the traffic signal. For example, the traffic signal detection system 500 can update the data record or data structure to include additional images and/or point clouds representing that traffic signal. As another example, the traffic signal detection system 500 can update the data record or data structure to include a modified bounding box for that traffic signal (e.g., a modified bounding box determined based, at least in part, on additional image data and/or point cloud data regarding the traffic signal). As another example, the traffic signal detection system 500 can update the data record or data structure to include a modified location and/or orientation of that traffic signal (e.g., a modified location and/or orientation determined based, at least in part, on additional image data and/or point cloud data regarding the traffic signal).

In some implementations, the traffic signal annotations 518 can be provided to a navigation system of an autonomous vehicle, such that the navigation system can guide the autonomous vehicle through an environment in accordance with the traffic signals. As an example, the traffic signal annotations 518 can be provided to the autonomous vehicle computer 202*f*, 400. Based on the traffic signal annotations 518, the autonomous vehicle computer 202*f*, 400 can determine the geographical locations and/or orientations of the traffic signals in the environment of the autonomous vehicle, determine any instructions being signaled by the traffic signals, and navigate the autonomous vehicle in accordance with those instructions. In some implementations, a autonomous vehicle computer 202*f*, 400 can be configured to prioritize the detection of traffic signals that are nearer to the autonomous vehicle and/or oriented towards the autonomous vehicle.

In some implementations, the traffic signal annotations 518 can be used to generate a feature map of a particular geographical region, including data regarding the geographical location and/or orientation of each of the traffic signals in that geographical region. As an example, a computer system can generate a map (e.g., two-dimensional map, such as an overhead map, or a three-dimensional map) of a geographical region. Further, the computer system can indicate the geographical location and/or orientation of each of the traffic signals in the map (e.g., using graphical icons, textual information, etc.). In some implementations, the map can be presented to a human operator (e.g., to aid in manual navigation of a vehicle) and/or to an autonomous vehicle (e.g., to aid in autonomous navigation of the vehicle).

In some implementations, the traffic signal annotations 518 can be used to train a machine learning system to detect traffic signals in an environment using images and/or point clouds. For example, the traffic signals annotations 518 can be used as positive examples (e.g., "ground truth" examples) of traffic signals in images and/or point clouds. Based on these examples, a machine learning system can trained to identify correlations, relationships, and/or trends between (i) the characteristics or images and/or point clouds, and (ii) the portions of the images or clouds (if any) that correspond to traffic signals. Accordingly, a machine learning system can be trained to recognize traffic more accurately without human input.

At least some of the techniques describe herein can be implemented using one or more machine learning models. As an example, FIG. 7A shows a diagram of an implementation of a machine learning model. More specifically, illustrated is a diagram of an implementation of a convolutional neural network (CNN) 720. For purposes of illustration, the following description of CNN 720 will be with respect to an implementation of CNN 720 by the traffic signal detection system 500. However, it will be understood that in some examples CNN 720 (e.g., one or more components of CNN 720) is implemented by other systems different from, or in addition to, the accessibility system 210, such as the autonomous vehicle compute 202*f*. While CNN 720 includes certain features as described herein, these features are provided for the purpose of illustration and are not intended to limit the present disclosure.

CNN 720 includes a plurality of convolution layers including first convolution layer 722, second convolution layer 724, and convolution layer 726. In some embodiments, CNN 720 includes sub-sampling layer 728 (sometimes referred to as a pooling layer). In some embodiments, sub-sampling layer 728 and/or other subsampling layers have a dimension (i.e., an amount of nodes) that is less than a dimension of an upstream system. By virtue of sub-sampling layer 728 having a dimension that is less than a dimension of an upstream layer, CNN 720 consolidates the amount of data associated with the initial input and/or the output of an upstream layer to thereby decrease the amount of computations necessary for CNN 720 to perform downstream convolution operations. Additionally, or alternatively, by virtue of sub-sampling layer 728 being associated with (e.g., configured to perform) at least one subsampling function (as described below with respect to FIGS. 7B and 7C), CNN 720 consolidates the amount of data associated with the initial input.

The traffic signal detection system 500 performs convolution operations based on the traffic signal detection system 500 providing respective inputs and/or outputs associated with each of first convolution layer 722, second convolution layer 724, and convolution layer 726 to generate respective outputs. In some examples, the traffic signal detection system 500 implements CNN 720 based on the traffic signal detection system 500 providing data as input to first convolution layer 722, second convolution layer 724, and convolution layer 726. In such an example, the traffic signal detection system 500 provides the data as input to first convolution layer 722, second convolution layer 724, and convolution layer 726 based on the traffic signal detection system 500 receiving data from one or more different systems (e.g., image data, point cloud data, training data, etc.). A detailed description of convolution operations is included below with respect to FIG. 7B.

In some embodiments, the traffic signal detection system 500 provides data associated with an input (referred to as an initial input) to first convolution layer 722 and the traffic signal detection system 500 generates data associated with an output using first convolution layer 722. In some embodiments, the traffic signal detection system 500 provides an output generated by a convolution layer as input to a different convolution layer. For example, the traffic signal detection system 500 provides the output of first convolution layer 722 as input to sub-sampling layer 728, second convolution layer 724, and/or convolution layer 726. In such an example, first convolution layer 722 is referred to as an upstream layer and sub-sampling layer 728, second convolution layer 724, and/or convolution layer 726 are referred to as downstream layers. Similarly, in some embodiments the traffic signal detection system 500 provides the output of sub-sampling layer 728 to second convolution layer 724 and/or convolution layer 726 and, in this example, sub-sampling layer 728 would be referred to as an upstream layer and second convolution layer 724 and/or convolution layer 726 would be referred to as downstream layers.

In some embodiments, the traffic signal detection system 500 processes the data associated with the input provided to CNN 720 before the accessibility system 210 provides the input to CNN 720. For example, the traffic signal detection system 500 processes the data associated with the input provided to CNN 720 based on the traffic signal detection system 500 and normalizing sensor data (e.g., image data, point cloud data, and/or the like).

In some embodiments, CNN 720 generates an output based on the traffic signal detection system 500 performing convolution operations associated with each convolution layer. In some examples, CNN 720 generates an output based on the traffic signal detection system 500 performing convolution operations associated with each convolution layer and an initial input. In some embodiments, the traffic signal detection system 500 generates the output and provides the output as fully connected layer 730. In some examples, the traffic signal detection system 500 provides the output of convolution layer 726 as fully connected layer 730, where fully connected layer 730 includes data associated with a plurality of feature values referred to as F1, F2 . . . FN. In this example, the output of convolution layer 726 includes data associated with a plurality of output feature values that represent a prediction.

In some embodiments, the traffic signal detection system 500 identifies a prediction from among a plurality of predictions based on the traffic signal detection system 500 identifying a feature value that is associated with the highest likelihood of being the correct prediction from among the plurality of predictions. For example, where fully connected layer 730 includes feature values F1, F2, . . . FN, and F1 is the greatest feature value, the traffic signal detection system 500 identifies the prediction associated with F1 as being the correct prediction from among the plurality of predictions. In some embodiments, the traffic signal detection system 500 trains CNN 720 to generate the prediction. In some examples, the traffic signal detection system 500 trains CNN 720 to generate the prediction based on the traffic signal detection system 500 providing training data associated with the prediction to CNN 720.

A prediction can include, for example, a predicted portion of an image corresponding to a traffic signal. As another example, a prediction can include one or more boundary boxes (e.g., represented as a series of vertices and/or lines) that enclose a portion of an image that is predicted to correspond to a traffic signal.

Figure 7B:
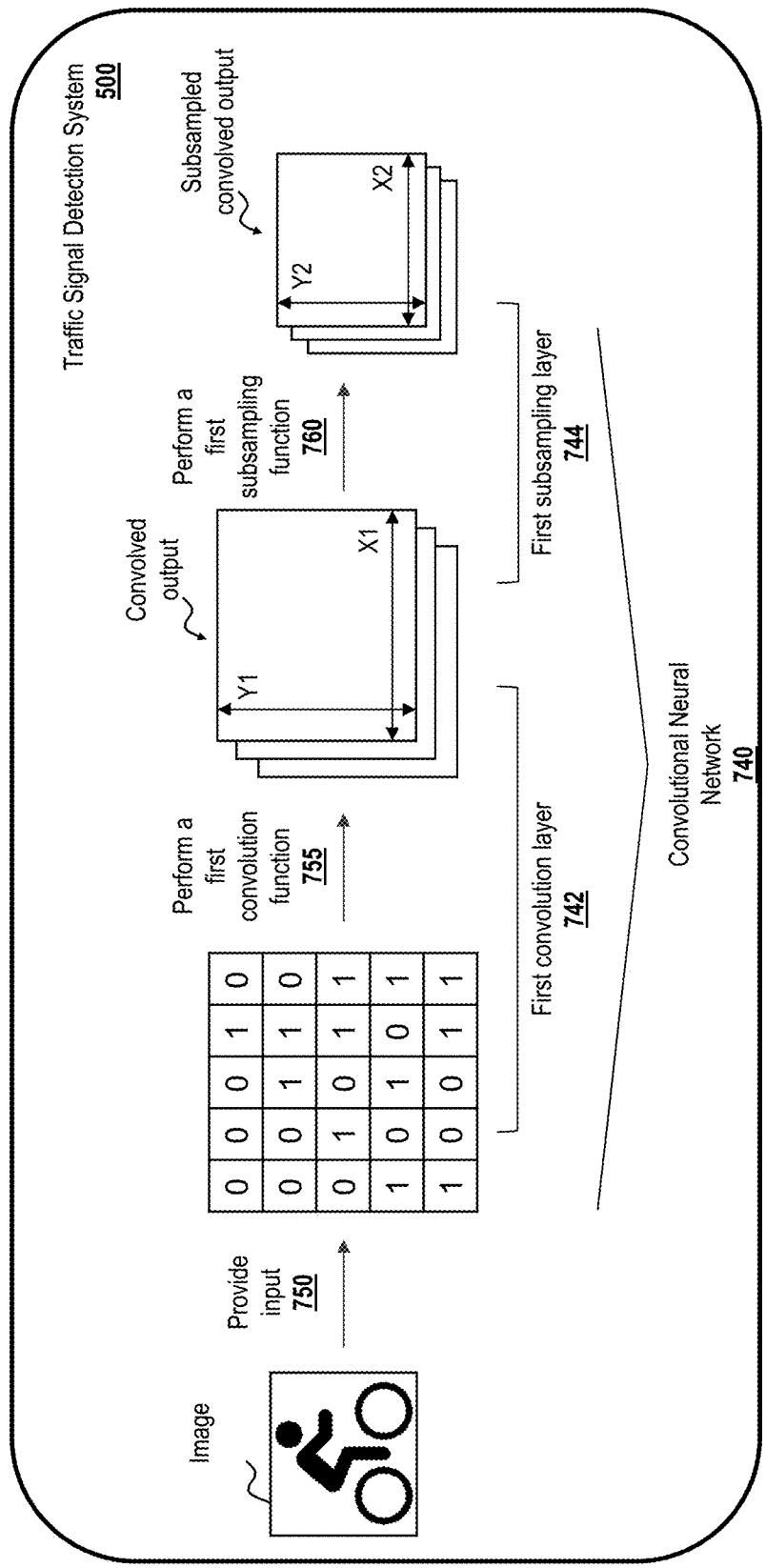
FIGS. 7B and 7C are diagram illustrating example operation of a neural network.
Figure 7C:
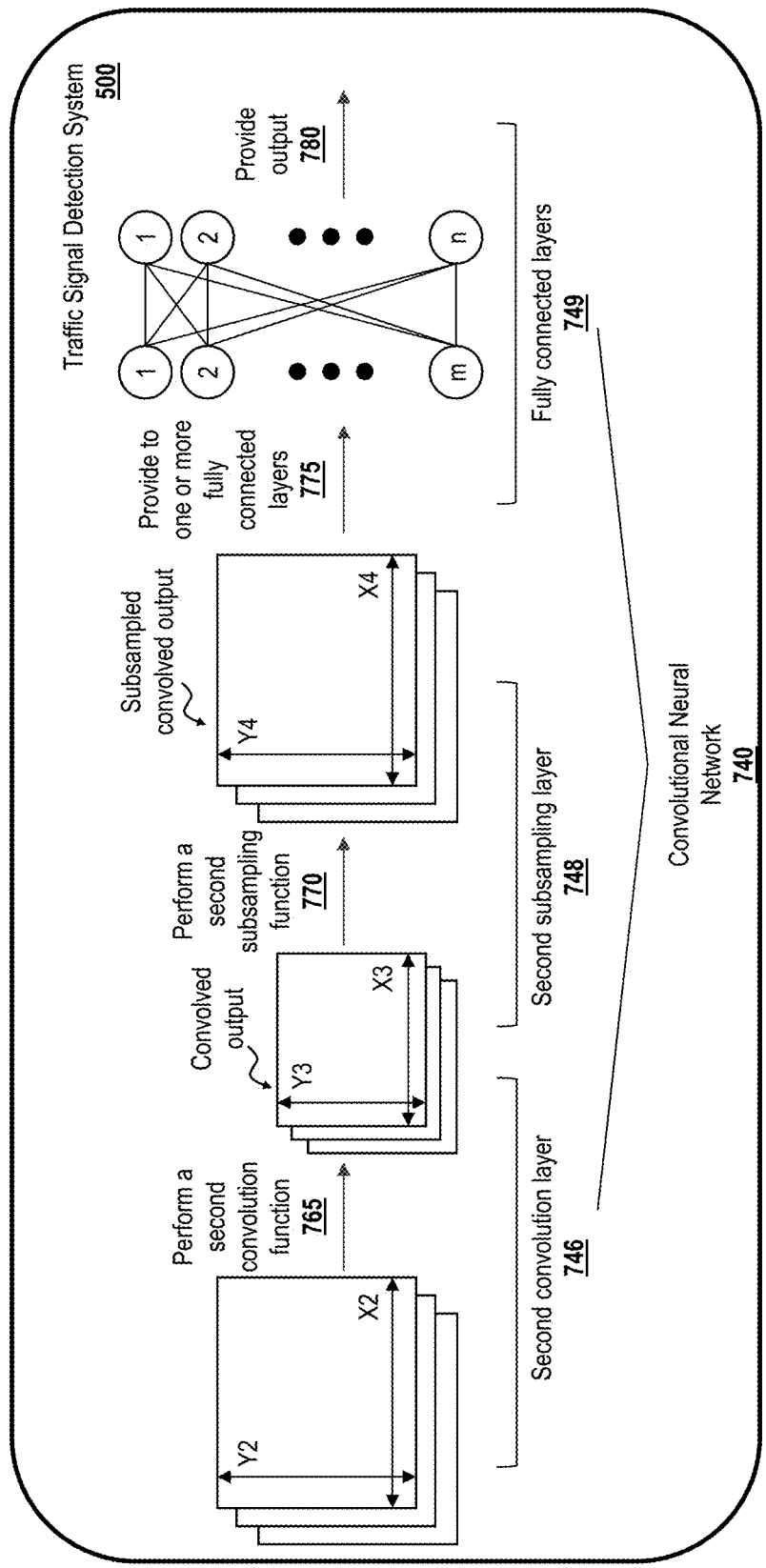

Referring now to FIGS. 7B and 7C, illustrated is a diagram of example operation of CNN 740 by the traffic signal detection system 500. In some embodiments, CNN 740 (e.g., one or more components of CNN 740) is the same as, or similar to, CNN 720 (e.g., one or more components of CNN 720) (see FIG. 7A).

At step 750, the traffic signal detection system 500 provides data as input to CNN 740 (step 750). For example, the traffic signal detection system 500 can provide image data 510 and/or point cloud data 514 data (e.g., obtained by one or more cameras 202a and LiDAR sensors 200b). As another example, the traffic signal detection system 500 can provide data received from the database 508.

At step 755, CNN 740 performs a first convolution function. For example, CNN 740 performs the first convolution function based on CNN 740 providing the values representing the input data as input to one or more neurons (not explicitly illustrated) included in first convolution layer 742. As an example, the values representing an image or video can correspond to values representing a region of the image or video (sometimes referred to as a receptive field). As another example, the values representing some other sensor measurement can correspond to values representing a portion of that sensor measurement (e.g., a particular temporal portion and/or a particular spectral portion).

In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges in an image (e.g., horizontal lines, vertical lines, straight lines, and/or the like). In successive convolution layers, the filters associated with neurons may be configured to identify successively more complex patterns in the image (e.g., arcs, objects, and/or the like). In another example, a filter may be configured to identify spectral portions of an audio signal (e.g., portions of an audio signal corresponding to particular frequencies and/or frequency ranges). In successive convolution layers, the filters associated with neurons may be configured to identify successively more complex patterns in the audio signal (e.g., patterns indicative of a location of a source of the audio, an identity or type of the source of the audio, etc.).

In some embodiments, CNN 740 performs the first convolution function based on CNN 740 multiplying the values provided as input to each of the one or more neurons included in first convolution layer 742 with the values of the filter that corresponds to each of the one or more neurons. For example, CNN 740 can multiply the values provided as input to each of the one or more neurons included in first convolution layer 742 with the values of the filter that corresponds to each of the one or more neurons to generate a single value or an array of values as an output. In some embodiments, the collective output of the neurons of first convolution layer 742 is referred to as a convolved output. In some embodiments, where each neuron has the same filter, the convolved output is referred to as a feature map.

In some embodiments, CNN 740 provides the outputs of each neuron of first convolutional layer 742 to neurons of a downstream layer. For purposes of clarity, an upstream layer can be a layer that transmits data to a different layer (referred to as a downstream layer). For example, CNN 740 can provide the outputs of each neuron of first convolutional layer 742 to corresponding neurons of a subsampling layer. In an example, CNN 740 provides the outputs of each neuron of first convolutional layer 742 to corresponding neurons of first subsampling layer 744. In some embodiments, CNN 740 adds a bias value to the aggregates of all the values provided to each neuron of the downstream layer. For example, CNN 740 adds a bias value to the aggregates of all the values provided to each neuron of first subsampling layer 744. In such an example, CNN 740 determines a final value to provide to each neuron of first subsampling layer 744 based on the aggregates of all the values provided to each neuron and an activation function associated with each neuron of first subsampling layer 744.

At step 760, CNN 740 performs a first subsampling function. For example, CNN 740 can perform a first subsampling function based on CNN 740 providing the values output by first convolution layer 742 to corresponding neurons of first subsampling layer 744. In some embodiments, CNN 740 performs the first subsampling function based on an aggregation function. In an example, CNN 740 performs the first subsampling function based on CNN 740 determining the maximum input among the values provided to a given neuron (referred to as a max pooling function). In another example, CNN 740 performs the first subsampling function based on CNN 740 determining the average input among the values provided to a given neuron (referred to as an average pooling function). In some embodiments, CNN 740 generates an output based on CNN 740 providing the values to each neuron of first subsampling layer 744, the output sometimes referred to as a subsampled convolved output.

At step 765, CNN 740 performs a second convolution function. In some embodiments, CNN 740 performs the second convolution function in a manner similar to how CNN 740 performed the first convolution function, described above. In some embodiments, CNN 740 performs the second convolution function based on CNN 740 providing the values output by first subsampling layer 744 as input to one or more neurons (not explicitly illustrated) included in second convolution layer 746. In some embodiments, each neuron of second convolution layer 746 is associated with a filter, as described above. The filter(s) associated with second convolution layer 746 may be configured to identify more complex patterns than the filter associated with first convolution layer 742, as described above.

In some embodiments, CNN 740 performs the second convolution function based on CNN 740 multiplying the values provided as input to each of the one or more neurons included in second convolution layer 746 with the values of the filter that corresponds to each of the one or more neurons. For example, CNN 740 can multiply the values provided as input to each of the one or more neurons included in second convolution layer 746 with the values of the filter that corresponds to each of the one or more neurons to generate a single value or an array of values as an output.

In some embodiments, CNN 740 provides the outputs of each neuron of second convolutional layer 746 to neurons of a downstream layer. For example, CNN 740 can provide the outputs of each neuron of first convolutional layer 742 to corresponding neurons of a subsampling layer. In an example, CNN 740 provides the outputs of each neuron of first convolutional layer 742 to corresponding neurons of second subsampling layer 748. In some embodiments, CNN 740 adds a bias value to the aggregates of all the values provided to each neuron of the downstream layer. For example, CNN 740 adds a bias value to the aggregates of all the values provided to each neuron of second subsampling layer 748. In such an example, CNN 740 determines a final value to provide to each neuron of second subsampling layer 748 based on the aggregates of all the values provided to each neuron and an activation function associated with each neuron of second subsampling layer 748.

At step 770, CNN 740 performs a second subsampling function. For example, CNN 740 can perform a second subsampling function based on CNN 740 providing the values output by second convolution layer 746 to corresponding neurons of second subsampling layer 748. In some embodiments, CNN 740 performs the second subsampling function based on CNN 740 using an aggregation function. In an example, CNN 740 performs the first subsampling function based on CNN 740 determining the maximum input or an average input among the values provided to a given neuron, as described above. In some embodiments, CNN 740 generates an output based on CNN 740 providing the values to each neuron of second subsampling layer 748.

At step 775, CNN 740 provides the output of each neuron of second subsampling layer 748 to fully connected layers 749. For example, CNN 740 provides the output of each neuron of second subsampling layer 748 to fully connected layers 749 to cause fully connected layers 749 to generate an output. In some embodiments, fully connected layers 749 are configured to generate an output associated with a prediction (sometimes referred to as a classification).

As an example, the output can include a prediction regarding the location of a traffic signal in image data. For instance, the output can indicate a series of vertices and/or lines representing a bounding boxing that encloses a portion of an image corresponding to a traffic signal. The vertices and/or lines can be represented, for example, as sets of image coordinates (e.g., x-y coordinates) and/or vectors.

As another example, the output can include a confidence metric representing the likelihood that a respective one of the portions of the image (e.g., a portion of the image enclosed by a bounding box) corresponds to a traffic signal.

Referring now to FIG. 8, illustrated is a flowchart of a process 800 for automatically detecting traffic signals using sensor data. In some embodiments, one or more of the steps described with respect to process 800 are performed (e.g., completely, partially, and/or the like) by the traffic signal detection system 500. Additionally, or alternatively, in some embodiments one or more steps described with respect to process 800 are performed (e.g., completely, partially, and/or the like) by another device or group of devices separate from or including the traffic signal detection system 500, such as a computer system remote from a vehicle (e.g., a server computer and/or a cloud computer system).

With continued reference to FIG. 8, a system obtains first sensor data and second sensor data regarding an environment of an autonomous vehicle (block 802). The first sensor data represents at least one image of the environment generated by at least one image sensor of the autonomous vehicle. Further, the second sensor data represents a three-dimensional point cloud associated with the environment. The second sensor data is generated by at least one range sensor of the autonomous vehicle.

In some implementations, obtaining the first sensor data can include receiving the at least one image (e.g., one or more two-dimensional images and/or three-dimensional images) generated by at least one still camera or video camera of the autonomous vehicle.

In some implementations, obtaining the second sensor data can include receiving the point cloud data generated by at least one LiDAR sensor of the autonomous vehicle.

With continued reference to FIG. 8, the system determines a portion of the at least one image corresponding to a traffic signal (e.g., traffic light, stop light, etc.) in the environment (block 804).

The system determines a point cluster of the point cloud corresponding to the portion of the at least one image (block 806).

In some implementations, determining the portion of the at least one image corresponding to the traffic signal can include determining a bounding box enclosing the traffic signal in the at least one image (e.g., at least in part using a computerized neural network).

Further, a confidence metric can be determined for the bounding box. The confidence metric can represent a likelihood that the bounding box encloses the traffic signal in the at least one image. In some implementations, the confidence metric can be determined, at least in part, based on a computerized neural network.

Further, determining the point cluster corresponding to the portion of the at least one image can also include determining a subset of the points of the point cloud coinciding with the bounding box. For example, the system can register the bounding box and the point cloud to one another, and determine the points that are enclosed by the bounding box.

The system determines a location of the traffic signal (e.g., a geographical location of the traffic signal) based on the point cluster (block 808).

In some implementations, the system can also determine an orientation of the traffic signal based on the point cluster. As an example, the system can fit a plane to the point cluster, and determine the orientation of the traffic signal based on an orientation of the plane. For instance, the orientation of the traffic signal can be represented by a normal vector of the plane.

In some implementations, the system can also transmit data representing the location of the traffic signal to a navigation system of the autonomous vehicle (e.g., to enable the navigation system to navigate the AV in accordance with the traffic signal). As an example, the data representation the location of the traffic signal can be transmitted to an autonomous vehicle compute, a perception system, a planning system, a localization system, or any other component of an autonomous vehicle can aid in the navigation of the autonomous vehicle through an environment).

In some implementations, the system can also transmit data representing the location of the traffic signal to a computer system remote from the autonomous vehicle. For example, the computer system can be configured to generate one or more feature maps of the environment based on the data plane (e.g., to enable other systems to use the traffic signal data, such as to produce training data for a machine learning system, general mapping system that identifies points of interest in a geographical region, etc.).

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    obtaining, by at least one processor, first sensor data and second sensor data regarding an environment of an autonomous vehicle,
        wherein the first sensor data represents at least one image of the environment generated by at least one image sensor of the autonomous vehicle, and
        wherein the second sensor data represents a three-dimensional point cloud associated with the environment, the second sensor data generated by at least one range sensor of the autonomous vehicle;
    determining, by the at least one processor, a portion of the at least one image corresponding to a traffic signal in the environment;
    determining, by the at least one processor, a point cluster of the point cloud corresponding to the portion of the at least one image; and
    determining, by the at least one processor, a location of the traffic signal and an orientation of the traffic signal based on the point cluster, wherein determining the orientation of the traffic signal comprises:
        fitting a plane to the point cluster, and
        determining the orientation of the traffic signal based on an orientation of the plane.

2. The method of claim 1, wherein obtaining the first sensor data comprises receiving the at least one image generated by at least one still camera or video camera of the autonomous vehicle.

3. The method of claim 1, wherein obtaining the second sensor data comprises receiving point cloud data generated by at least one LiDAR sensor of the autonomous vehicle.

4. The method of claim 1, wherein determining the portion of the at least one image corresponding to the traffic signal comprises:
    determining a bounding box enclosing the traffic signal in the at least one image.

5. The method of claim 4, wherein determining the bounding box comprises determining the bounding box using a computerized neural network.

6. The method claim 4, further comprising:
    determining a confidence metric representing a likelihood that the bounding box encloses the traffic signal in the at least one image.

7. The method of claim 6, wherein determining the confidence metric comprises determining the confidence metric based on a computerized neural network.

8. The method of claim 4, wherein determining the point cluster corresponding to the portion of the at least one image comprises:
    determining a subset of the points of the point cloud coinciding with the bounding box.

9. The method of claim 1, further comprising:
    transmitting data representing at least one of the location of the traffic signal or the orientation of the traffic signal to a navigation system of the autonomous vehicle.

10. The method of claim 1, further comprising:
    transmitting data representing at least one of the location of the traffic signal or the orientation of the traffic signal to a computer system remote from the autonomous vehicle, wherein the computer system is configured to generate one or more feature maps of the environment based on the data.

11. A system, comprising:
    at least one processor; and
    at least one non-transitory storage media storing instructions that, when executed by the at least one processor, cause the at least one processor to:
        obtain first sensor data and second sensor data regarding an environment of an autonomous vehicle,
            wherein the first sensor data represents at least one image of the environment generated by at least one image sensor of the autonomous vehicle, and
            wherein the second sensor data represents a three-dimensional point cloud associated with the environment, the second sensor data generated by at least one range sensor of the autonomous vehicle;
        determine a portion of the at least one image corresponding to a traffic signal in the environment;
        determine a point cluster of the point cloud corresponding to the portion of the at least one image; and
        determine a location of the traffic signal and an orientation of the traffic signal based on the point cluster, wherein determining the orientation of the traffic signal comprises:
            fitting a plane to the point cluster, and
            determining the orientation of the traffic signal based on an orientation of the plane.

12. At least one non-transitory storage media storing instructions that, when executed by at least one processor, cause the at least one processor to:
    obtain first sensor data and second sensor data regarding an environment of an autonomous vehicle,
        wherein the first sensor data represents at least one image of the environment generated by at least one image sensor of the autonomous vehicle, and
        wherein the second sensor data represents a three-dimensional point cloud associated with the environment, the second sensor data generated by at least one range sensor of the autonomous vehicle;
    determine a portion of the at least one image corresponding to a traffic signal in the environment;
    determine a point cluster of the point cloud corresponding to the portion of the at least one image; and determine a location of the traffic signal and an orientation of the traffic signal based on the point cluster, cluster, wherein determining the orientation of the traffic signal comprises:
fitting a plane to the point cluster, and
determining the orientation of the traffic signal based on an orientation of the plane.

* * * * *

UNITED STATES PATENT AND TRADEMARK OFFICE
CERTIFICATE OF CORRECTION

| | |
|---|---|
| PATENT NO. | : 12,046,049 B2 |
| APPLICATION NO. | : 17/539412 |
| DATED | : July 23, 2024 |
| INVENTOR(S) | : Dhananjai Sharma and Bartolomeo Della Corte |

It is certified that error appears in the above-identified patent and that said Letters Patent is hereby corrected as shown below:

In the Claims

In Claim 6, Column 28, Line 4, after "method" insert -- of --.

In Claim 12, Column 29, Line 2, delete "point cluster, cluster," and insert -- point cluster, --.

Signed and Sealed this
First Day of October, 2024

Katherine Kelly Vidal
*Director of the United States Patent and Trademark Office*